Feb. 10, 1942.                    M. SCHLATTER ET AL                    2,272,624
                                     WEDGE-UP CLAMP
                                   Filed Feb. 17, 1939
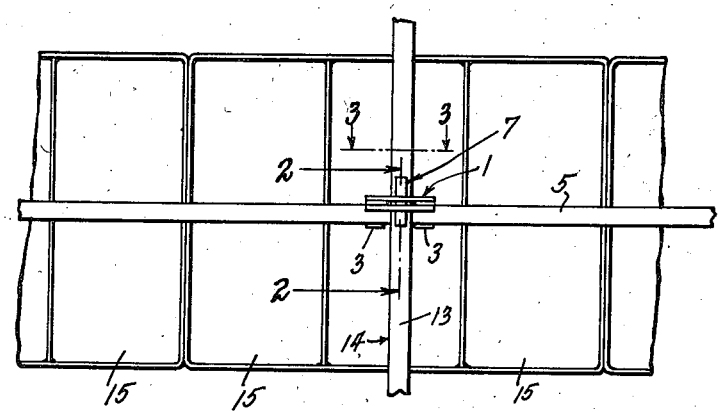
Fig. 1.
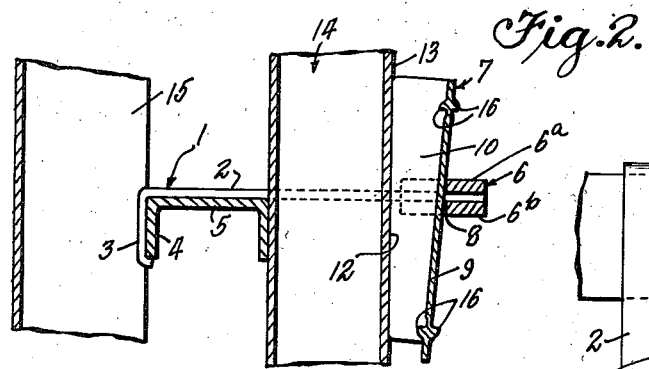
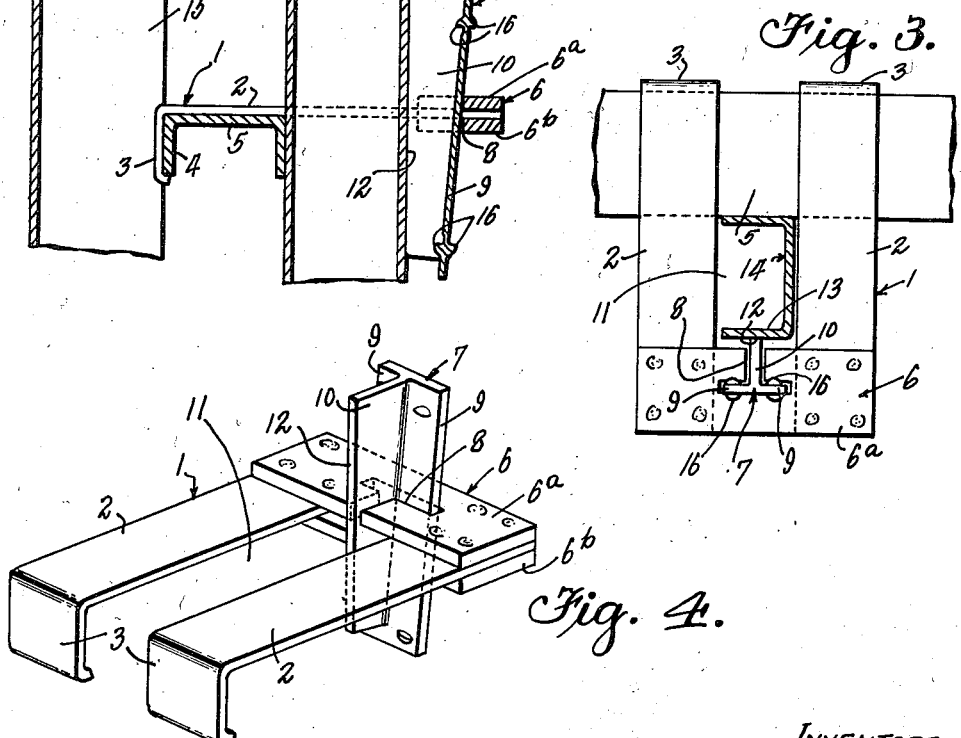
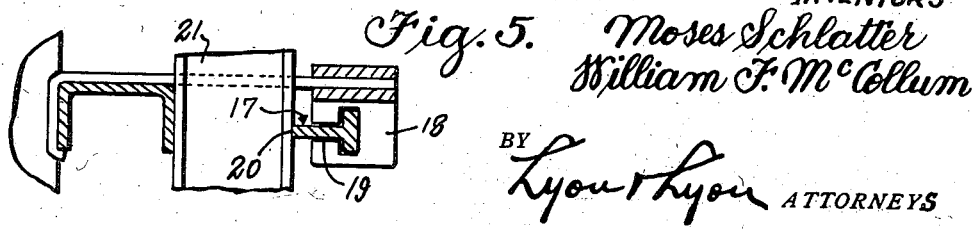
INVENTORS
Moses Schlatter
William F. McCollum
BY Lyon & Lyon ATTORNEYS Patented Feb. 10, 1942

2,272,624

UNITED STATES PATENT OFFICE 2,272,624

WEDGE-UP CLAMP

Moses Schlatter and William F. McCollum,
Los Angeles, Calif.

Application February 17, 1939, Serial No. 256,960

4 Claims. (Cl. 287—49)

This invention relates to a clamp for securing structural parts together, and while the clamp may be used for various specific purposes, it is intended to be particularly useful for clamping together two crossed bars that are in contact with each other, or substantially so. The particular purpose for which this clamp is most useful, is in clamping together crossed bars employed for aligning units of forms for producing molds for walls or floors of plastic material, such as concrete.

An object of the invention is to produce a clamp of simple construction, which can be quickly applied to secure two crossed bars rigidly together, and which can be readily disconnected when desired.

A further object of the invention is to construct the clamp in such a way that a wedge which is included in the construction, will retain itself in the body of the clamp and not become disconnected from the body of the clamp when the clamp is not in use, or when the wedge of the clamp is being driven back from its tight position.

Further objects of the invention will appear hereinafter.

The invention consists in the novel parts and combination of parts to be described hereinafter, all of which contribute to produce an efficient wedge-up clamp.

A preferred embodiment of the invention is described in the following specification, while the broad scope of the invention is pointed out in the appended claims.

In the drawing:

Fig. 1 is a side elevation illustrating the clamp applied to two crossed bars employed for aligning and holding in place a plurality of form units such as illustrated in this figure.

Fig. 2 is a vertical section taken about on the line 2—2 of Fig. 1, illustrating a short portion of the side wall of one of the form units, and showing the two crossed bars also in section, together with the wedge that is mounted in the body of the clamp. This view is upon an enlarged scale.

Fig. 3 is a horizontal section taken on the line 3—3 of Fig. 1, passing through one of the crossed bars, and showing the clamp in plan and a portion of one of the crossed bars. This view, however, does not show any part of the form unit illustrated in Fig. 2.

Fig. 4 is a perspective of the clamp removed from the bars which it may clamp together, as illustrated in the other figures.

Fig. 5 is a vertical section similar to Fig. 2, illustrating a slightly modified embodiment of the invention.

In practicing the invention, we construct the clamp 1 of a body composed of two spaced arms 2, which are preferably disposed substantially parallel with each other. Their inner ends are formed into hooks 3 adapting them to engage the flange 4 of a bar 5, such as a channel bar as illustrated in Fig. 2. The outer end of the body includes a cross-head 6, which is preferably formed of two short plates 6a and 6b that are secured respectively on the upper and lower faces of the arms 2, being secured to the same by rivets or welding. The cross head 6 supports a wedge member 7, in the form of a short bar so constructed that the wedge is supported slidably on the clamp, and preferably in the cross head. In the present instance this is accomplished preferably by providing a slot that is made of angle form so that it will retain the wedge, although permitting the edge of the wedge to project out of it in performing its wedging function. This slot is preferably a T-shaped slot 8 that passes through the cross head 6; that is to say, two aligning T-shaped slots are punched in the plates 6a and 6b for this purpose. These slots carry the wedge which is also of T-form in cross-section, comprising two oppositely disposed flanges 9 and a web 10 that projects toward or into the throat 11 that is formed between the spaced arms 2. In other words, the "staff" of the T-shaped slot extends into the cross head 6 from the inner edge.

The flanges 9 are of uniform width, so that they are guided freely in the head of the T-shaped slot. The web 10, however, is tapered longitudinally, and the taper is cut so that when the wedge is tightened up its inner edge 12 will seat readily against the outer side of flange 13 of the other bar 14 which it clamps against the first-named bar 5.

While the bars 5 and 14 are illustrated as of channel-form, it should be understood that this clamp can be applied to crossed bars of ordinary angle cross-section, so long as the bars present a flange or part against which the wedge 7 can press when it is tightened up. It can also be applied to wooden bars of square or rectangular cross-section.

In the present instance, the bar 5 is represented as a horizontal alignment bar for form sections or units 15 set up alongside of each other, and the bar 14 is a vertical bar crossing the bar 5 and in contact with the same.

Of course, the T-form of the slot 8 assists in preventing the wedge 7 from falling out as the clamp would usually be used in the manner indicated so that the wedge would be tightened up by driving it downwardly. However, in order to insure that the wedge will not fall out of the cross head 6, I prefer to apply or form small projections or lugs 16 toward the ends of the flanges 9, that will not permit the flanges to pass out of the slot 8. These small projections or lugs, of course are placed on the wedge after it has been put in place in the slot. Figure 3 particularly illustrates how these projections will prevent the wedge from falling out of the slot.

It will be evident that this clamp can be very inexpensively constructed, and it has the advantage that it can be very quickly applied and very quickly released when desired. Although it is represented in the drawing as applied with the bar 14 lying in the throat 11, it should be evident that it could also be applied to clamp two parallel bars.

In Figure 5 we illustrate a modification in which the wedge 17 is mounted in a pair of flanges such as the flange 18, by means of T-slots such as the slot 19; that is to say, the wedge is tightened up by driving it forward in a horizontal plane, so that its inner edge 20 seats against one of the bars 21.

Many other embodiments of this invention may be resorted to without departing from the spirit of the invention.

What we claim is:

1. A clamp for securing two crossed bars, said clamp having a body comprising a pair of spaced arms with hook-ends for engaging over one of the bars, said arms forming a throat between the same to receive the other bar, said clamp also having a cross-head connecting said arms; said cross-head having a slot and an angle-form wedge mounted to fit in the slot and slide in said slot with its edge projecting out of the slot and toward the hook-ends of the said spaced arms to engage the other bar.

2. A clamp for securing two crossed bars, said clamp having a body comprising a pair of spaced arms with hook-ends for engaging over one of the bars, said arms forming a throat between the same to receive the other bar, said clamp also having a cross-head connecting said arms; said cross-head having a substantially T-shaped slot formed therein extending inwardly into the same from the inner edge of the cross-head, and a T-shaped wedge guided in said slot and having a web to project through the said slot and toward the hook-ends so as to engage the other bar.

3. A clamp for securing two cross bars, said clamp comprising a pair of spaced arms, with ends for engaging over one of the bars, said arms forming a throat between the same to receive the other bar, said clamp also having a cross-head connecting said arms, comprising a pair of plates secured on the opposite faces of said spaced arms, said plates having aligning slots extending into said plates from their inner edges; and a wedge supported in said slots and having a part projecting at the inner edge of the cross-head to engage the said other bar.

4. A clamp for securing two crossed bars, said clamp having a body comprising a pair of spaced arms with hook ends projecting in the same direction from the arms for engaging over one of the bars, and a cross bar, said arms and cross bar forming a throat between the same to receive the other bar, said cross bar having a slot therein extending into the same at said throat, and a wedge supported and guided in said slot, said wedge and said slot having a correlated form enabling the slot to retain the wedge and prevent the same from moving laterally out of the slot into the throat but cooperating to enable the edge of the wedge to project into the throat to engage the other bar and clamp the same against the first named bar.

MOSES SCHLATTER.
WILLIAM F. McCOLLUM.